United States Patent Office

Re. 27,551
Reissued Jan. 16, 1973

27,551
β-ALKOXY-TRIFLUOROMETHYLPHENALKYL-AMINES

John A. Faust, Solvang, Calif., and Melville Sahyun, 102 E. Pueblo St., Santa Barbara, Calif.; said Faust assignor to Said Melville Sahyun, doing business as Sahyun Laboratories, Santa Barbara, Calif.

No Drawing. Original No. 3,459,803, dated Aug. 5, 1969, Ser. No. 666,457, Sept. 8, 1967, which is a continuation-in-part of Ser. No. 467,759, June 28, 1965. Application for reissue July 28, 1970, Ser. No. 59,042
Int. Cl. C07c *93/02*
U.S. Cl. 260—570.6 7 Claims

Matter enclosed in heavy brackets [ ] appears in the original patent but forms no part of this reissue specification; matter printed in italics indicates the additions made by reissue.

ABSTRACT OF THE DISCLOSURE

Alkoxy-trifluoromethylphenalkyl amines useful to reduce nausea and to depress appetite [.] *and the process of reducing appetite by the administration of a lower-alkoxy-substituted trifluoromethylphenalkyl secondary amine.*

This invention relates to novel secondary amines, more particularly to lower-alkoxy-substituted trifluoromethylphenalkyl secondary amines.

This application is a continuation-in-part of application S.N. 467,759, filed June 28, 1965 and now abandoned.

The composition aspect of this invention resides in the concept of lower-alkoxy-substituted trifluoromethylphenalkyl secondary amines.

The process of use aspect of this invention resides in the concept of administering a lower-alkoxy-substituted trifluoromethylphenalkyl secondary amine in a pharmaceutically acceptable form to mammalian animals to reduce nausea.

Another process of use aspect of this invention resides in the concept of administering a lower-alkoxy-substituted trifluoromethylphenalkyl secondary amine in a pharmaceutically acceptable form to mammalian animals to reduce appetite.

The phenalkylamines of this invention can be represented by the formula

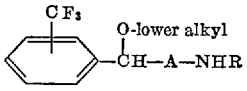

I wherein R is hydroxyethylene or hydrocarbon containing 1–8 carbon atoms, preferably lower-alkyl, and A is a 1–3 carbon atom alkylene bridge, containing a total of 1–8 carbon atoms, joining the lower-alkoxy group-bearing carbon atom and the amine nitrogen atom, e.g., methylene, ethylene and trimethylene, any of whose carbon atoms can bear one or more alkyl groups so as to contain up to a total of 8 carbon atoms, preferably methylene with or without a methyl group. Especially preferred are each of the above whose $CF_3$ group is in the meta-position.

As used herein, the term "hydrocarbon" includes alkyl, e.g., methyl, ethyl, octyl, alkenyl, e.g. allyl, alkynyl, aryl, e.g., phenyl, alkaryl, e.g., tolyl, aralkyl, e.g., benzyl, phenethyl, cycloalkyl, e.g., cyclopropyl, cyclopentyl, cyclohexyl, cyclohexylmethyl and cycloalkenyl, e.g., cyclohexenyl. Preferred are the saturated hydrocarbon of e.g., alkyl, cycloalkyl, alkylcycloalkyl and cycloalkylalkyl, especially cycloalkyl and alkyl.

As used herein the terms "lower-alkyl" and "lower-alkoxy" refer respectively, to alkyl and alkoxy groups containing from one to eight carbon atoms, preferably less than five carbon atoms, which can be straight-chain or branched. Representative alkyl radicals are methyl, ethyl, propyl, isopropyl, n-butyl and sec-butyl, amyl, isoamyl, hexyl, heptyl and octyl. Representative lower-alkoxy radicals are methoxy, ethoxy, propoxy, isopropoxy, n-butoxy, and sec-butoxy, amyloxy and octyloxy.

Racemic mixtures are obtained as the carbon atom which bears the ether substituent and which is attached to the benzene ring is asymmetric. Also, when a carbon atom in the methylene chain is asymmetric, a further racemate mixture is possible. Racemate pairs can be separated by fractional crystallization of an acid addition salt and each d and l isomer can be separated from the racemate in the conventional manner.

The compounds of this invention comprise the acid addition salts. When the tangible embodiments of the invention are employed for their pharmacological effect, they ordinarily will be used in the form of their nontoxic acid addition salts, i.e., pharmaceutically acceptable salts. However, any acid addition comes within the scope of this invention as they are all useful, e.g., for purifying the free base or for separating racemate mixtures.

Suitable non-toxic, i.e., pharmaceutically acceptable, acid addition salts are those formed from mineral acids, e.g., hydrochloric acid, hydrobromic acid, hydroiodic acid, nitric acid, phosphoric acid and sulfuric acid, and organic acids, e.g., acetic acid, citric acid, tartaric acid, lactic acid, and the like, which provide the hydrochloride, hydrobromide, hydroiodide, nitrate, phosphate or acid phosphate, sulfate or bisulfate, acetate, citrate or acid citrate, tartrate or bitartrate, and the lactate salts, respectively.

Equivalents of the compounds of this invention are those of the above formula bearing additional simple substituents on the benzene ring of the molecule, e.g., one, two or more of lower-alkyl, aryl, alkaryl, halo, including, chloro and bromo, trifluoromethyl, hydroxy, nitro, etc., in the 2,4,5, or 6-position.

Preferred of the compounds of this invention are those wherein the N-lower-alkyl group is methyl or ethyl, the lower-alkoxy group is methoxy or ethoxy, and the methylene bridge contains one or at most two carbon atoms, i.e., the alpha-unsubstituted and alpha-methyl-phenethyl compounds, and those having combinations of these preferred groups, e.g., N,α-di-methyl-beta-methoxy-m-trifluoromethylphenethylamine,
N-methyl-beta-methoxy-m-trifluoromethylphenethylamine,
N-methyl-beta-ethoxy-m-trifluoromethylphenethylamine,
N-ethyl-beta-methoxy-m-trifluoromethylphenethylamine, and
N-ethyl-beta-ethoxy-m-trifluoromethylphenethylamine.

The following is the manner and process of making and using the invention and the best mode contemplated of carrying out the invention.

The compounds of this invention can be prepared by first converting a trifluoromethyl substituted phenyl bromide to the corresponding Grignard reagent.

The magnesium Grignard reagent is then reacted with a lower-alkyl α,ω-dihalo-lower-alkyl ether to form a trifluoromethylphenalkyl halide bearing a lower-alkoxy group on the carbon atom alpha to the phenyl ring. Displacement of the halogen atom by reaction with a primary amine produces the compounds of this invention.

These reactions can be illustrated by the following formulae:

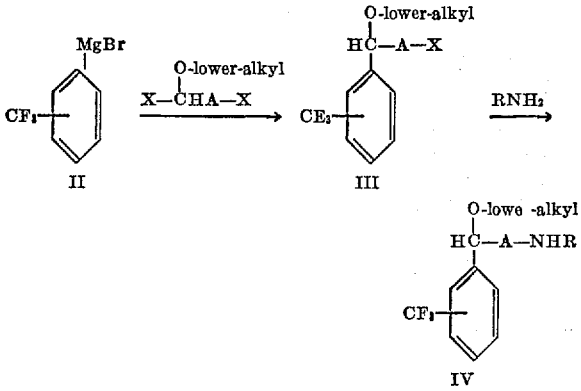

A and R having the value given above and X is Cl or Br.

The compounds of this invention possess anti-emetic, anti-tussive and anorexic activities. In addition, they exhibit some CNS effects, manifested primarily as depressant, e.g., sedative activities, in most species usually at doses higher than that required to obtain anti-emetic or anorexic activity. Mydriasis is also produced at high dosage levels. They are nicotine antagonists and protect at low oral doses against otherwise fatal doses of nicotine. The combination of anti-emetic and anti-tussive activities is unusual in phenethylamines, whether the β-methylene carbon atom is unsubstituted or substituted with hydroxy or alkoxy, Similarly, phenethylamines known to possess anti-emetic activity, e.g., the amphetamines, also undesirably produce CNS stimulation, e.g., pressor, effects.

The compounds of this invention can be administered orally, subcutaneously, intravenously, intraperitoneally, etc., in the usual pharmaceutical forms, e.g., admixed with pharmaceutical excipients in the form appropriate, e.g., tablets, capsules, suppositories, in liquid emulsions, solutions, suspensions, etc. Their intravenous and intramuscular antiemetic activity is particularly valuable because of the difficulty in orally administering drugs in cases of extreme nausea. The selected compound generally should be present in a concentration which will provide at least about 1 mg. per unit dosage, i.e., per tablet, capsule, teaspoonful, etc. The usual I.M. oral dose is about 0.1 to 2.0 mg./kg. or more. Up to about 5 mg./kg. About 10 or more times this dosage can be administered to laboratory test animals for test purposes. Effective I.P. and oral dosages are about 1.5–10 times these amounts.

The following preparations and examples are illustrative of the compounds of this invention and of the processes by which they can be prepared. Temperatures are given in degrees centigrade.

PREPARATION 1

Beta-methoxy-3-trifluoromethyl-phenethyl bromide

To a stirred solution of the Grignard reagent prepared from 124 grams (0.5 mole) of 3-bromo-alpha, alpha, alpha-trifluorotoluene and 14 grams (0.57 mole) of magnesium in 500 milliliters of anhydrous ether was added an ether solution of 109 grams (0.5 mole) of alpha, beta-dibromoethyl methyl ether. The homogeneous reaction mixture was allowed to remain overnight at 25 degrees and was then refluxed for 6 hours. The mixture was poured into iced dilute hydrochloric acid. The ether layer was separated, washed, dried and distilled. The yield of beta-methoxy-3-trifluoromethyl-phenethyl bromide was 125 grams (80 percent), B.P. 82–87° C./1.7 mm.; 119–120° C./20 mm.

PREPARATION 2

Beta-ethoxy-3-trifluoromethyl-phenethyl bromide

The reaction of 0.3 mole of alpha, beta-dibromoethyl ethyl ether with 0.3 mole of 3-trifluoromethyl-phenyl magnesium bromide according to the method of Preparation 1 gave on distillation 60 grams (67 percent) of beta-ethoxy-3-trifluoromethyl-phenethyl bromide, B.P. 88–90° C./0.2 mm.

In the same manner, beta-n-butoxy-3-trifluoromethyl-phenethyl bromide is prepared from alpha, beta-dibromoethyl n-butyl ether.

Following the procedure of Preparation 1, beta-methoxy - 4 - trifluoromethyl-phenethylbromide and other beta-lower alkoxy - 4-trifluoromethylphenethyl bromides are prepared by the reaction of 4 - trifluoromethyl-phenethyl magnesium bromide with alpha, beta-dibromoethyl ethyl ether and other alpha, beta-dibromoethyl lower-alkyl ethers. The corresponding beta-methoxy - 2 - trifluoromethylphenethyl bromide and other beta-lower-alkoxy - 2-trifluoromethylphenethyl bromides are similarly prepared using 2-trifluoromethylphenyl magnesium bromide. The alpha-alkyl-beta-lower alkoxy-2-, 3- and 4-trifluoromethylphenethyl bromides are prepared by employing the appropriate alpha-beta-dihalo-lower-alkyl lower-alkyl ether.

Example 1.—N-methyl-β-methoxy-β-(3-trifluoromethyl) phenethylamine hydrochloride A mixture of 40 g. (0.14 mole) of β-methoxy-3-trifluoromethylphenethyl bromide, 40 g. (1.3 mole) of monomethylamine and 400 ml. of isopropyl alcohol, contained in a pressure vessel, was heated at 60–65° for 24 hours. The excess methylamine and alcohol were removed by distillation, and the residue was partitioned between dilute hydrochloric acid and ether. The aqueous solution was made alkaline with sodium hydroxide and the liberated oily base was extracted with ether. Distillation of the dried ether solution yielded 18.6 g. (57 percent) of N-methyl-β-methoxy-β-(3 - trifluoromethyl) phenethylamine, B.P. 113–117° (21 mm.).

Analysis.—Calculated for $C_{11}H_{14}F_3NO$: N, 6:00 Neut. Equiv., 233. Found: N, 5.50; Neut. Equiv., 240.

The hydrochloride, prepared in ether and recrystallized from a mixture of isopropyl alcohol and ether, melted at 195–196°.

Analysis.—Calculated for $C_{11}H_{14}F_3NO \cdot HCl$: N, 5.19; $Cl^-$, 13.14. Found: N, 5.00; $Cl^-$, 13.56.

Example 2.—N-methyl-β-methoxy-β-(2-trifluoromethyl)phenethylamine hydrochloride (a) β-Methoxy - β - (2-trifluoromethyl)phenethyl bromide.—To the Grignard reagent, prepared from 22.5 g. (0.1 mole) of commercial o-bromobenzotrifluoride and 2.4 g. (0.1 g. at.) of magnesium in ether, there was added, dropwise at 25°, an ether solution of 21.8 g. (0.1 mole) of α,β-dibromoethyl-methyl ether. (J. Am. Chem. Soc. 52, 651 (1930); J.C.S. 1942, 520.) The reaction caused the ether to reflux, and refluxing was continued for one hour after the addition. The cooled solution was poured over iced hydrochloric acid and the ether layer was separated, washed with water, dried and distilled to yield 15.6 g. (55 percent) of β-methoxy-β-(2-trifluoromethyl) phenethyl bromide, B.P. 71–75° (0.5 mm.).

(b) N-methyl-β-methoxy - β - (2-trifluoromethyl)phenethylamine hydrochloride.—A solution of 11.8 g. (0.042 mole) of β-methoxy-β-(2-trifluoromethyl)phenethyl bromide in 75 ml. of isopropyl alcohol containing 16 g. (0.5 mole) of methylamine was heated, in a pressure bottle, at 65° for 44 hours. The cooled solution was distilled to remove the excess methylamine and isopropyl alcohol and the residue was partitioned between dilute hydrochloric acid and ether. The aqueous solution was made alkaline and the liberated base was extracted with ether and distilled. Yield, 3.3 g. (34 percent) of N-methyl-β-methoxy-β-(2-trifluoromethyl)phenethylamine, B.P. 113–115° (22 mm.).

Analysis.—Calculated for $C_{11}H_{14}F_3NO$: N, 6.01; Neut. Equiv., 233. Found: N, 5.68; Neut. Equiv., 235.

The hydrochloride, prepared in ether with ethereal hydrogen chloride, melted at 257–258° after recrystallization from methanol-ether.

Analysis.—Calculated for $C_{11}H_{14}F_3NO \cdot HCl$: N, 5.19; $Cl^-$, 13.15. Found: N, 4.80; $Cl^-$, 13.40.

Example 3.—N-methyl-β-methoxy-β-(4-trifluoromethyl)phenethylamine hydrochloride (a) β-Methoxy-β-(4-trifluoromethyl)phenyl bromide.—This compound was prepared in the same manner as the corresponding 2-trifluoromethyl compound as described in Example 2a. From 0.1 mole of p-bromobenzotrifluoride there was obtained 16.8 g. (72 percent) of β-methoxy-β-(4-trifluoromethyl)phenyl bromide, B.P. 71–75° (0.5 mm.).

(b) N-methyl-β-methoxy - β - (4-trifluoromethyl)phenethylamine hydrochloride.—A heterogenous mixture of 16.8 g. (0.06 mole) of the bromo compound of Example 2a and 92 g. (1.2 mmole) of 40 percent aqueous methylamine was heated at 50–55° in a pressure bottle, for 64 hours. The excess methylamine was removed by distillation, and the residue was partitioned between dilute hydrochloric acid and ether. The aqueous solution was made alkaline, and the liberated base was extracted with ether and distilled. Yield: 3.4 g. (24 percent) of N-methyl-β-methoxy-β-(4 - trifluoromethyl)phenethylamine, B.P. 120–122° (20 mm.).

The hydrochloride, prepared in ether with ethereal hydrogen chloride, melted at 233–234° after recrystallization from a mixture of ethanol and ether.

(c) N-methyl-γ-methoxy-γ-(3 - trifluoromethylphenyl) propylamine hydrochloride.—An autoclave was charged with 175 ml. of isopropyl alcohol containing 31 g. (1 mole) of methylamine and 17.3 g. (0.068 mole) of the above chloro-ether. The temperature of the mixture was maintained at 95–100° for 14 hours, after which the solution was distilled to remove the excess methylamine and the solvent. The residue was partitioned between dilute hydrochloric acid and ether, and the aqueous solution was rendered alkaline. The liberated base was isolated by ether extraction and distilled. Yield: 9 g. (54 percent) of N-methyl-γ-methoxy-γ-(3 - trifluoromethylphenyl)propylamine, B.P. 126–128° (20 mm.).

Analysis.—Calculated for $C_{12}H_{16}F_3NO$: N, 5.67; Neut. Equiv., 247. Found: N, 5.32; Neut. Equiv., 238.

The hydrochloride, prepared in ether with hydrogen chloride, melted at 111–112° after recrystallization from a mixture of ethanol and ether.

Analysis.—Calculated for $C_{12}H_{16}F_3NO \cdot HCl$: N, 4.94; $Cl^-$, 12.45. Found: N, 4.81; $Cl^-$, 12.71.

Following the procedure of Example 1, the following compounds were prepared by substituting the appropriate amine for the methylamine in the alkylation reaction

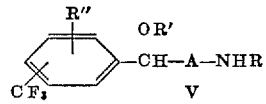

V

| Ex. | R' | $CF_3$ | R'' | A | R | B.P. (base) (mm.) | M.P. (·HCl) |
|---|---|---|---|---|---|---|---|
| 5 | $CH_3$ | m | H | $CH_2$ | $C_2H_5$ | 122–4/20 | [1] 189–199 |
| 6 | $CH_3$ | m | H | $CH_2$ | $C_4H_9$ | 145–7/20 | [2] 138–130 |
| 7 | $CH_3$ | m | H | $CH_2$ | $CH(CH_3)_2$ | ---------- | [1] 155–157 |
| 8 | $CH_3$ | m | H | $CH_2$ | $CH_2CH{=}CH_2$ | ---------- | [3] 146–147 |
| 9 | $CH_3$ | m | H | $CH_2$ | $CH_2CH_2OH$ | ---------- | [3] 152–153 |
| 10 | $CH_3$ | m | H | $CH_2$ | cyclohexyl | 106–9/0.25 | [2] 140–141 |
| 11 | $CH_3$ | m | H | $CH_2$ | benzyl | 135–7/0.3 | 165–167 |
| 12 | $CH_3$ | m | H | $CH_2$ | phenethyl | ---------- | [3] 170–171 |
| 13 | $C_2H_5$ | m | H | $CH^3$ | $CH_3$ | ---------- | [2] 142–144d |
| 14 | $C_2H_5$ | m | H | $CH_2$ | $CH_2CH_2OH$ | 134–5.0/0.2 | ---------- |
| 15 | $C_4H_9$ | m | H | $CH_2$ | $CH_3$ | 134–8/20 | [3] 128–129 |
| 16 | $CH_3$ | m | H | $CH(CH_3)$ | $CH_3$ | 119–20/23 | [1] 165–166 |
| 17 | $CH_3$ | m | H | $CH_2$ | cyclopentyl | ---------- | [5] 144–145 |
| 18 | $CH_3$ | m | H | $CH_2$ | $C(CH_3)_3$ | 125–28/26 | [1] 235–236 |
| 19 | $CH_3$ | p | H | $CH_2$ | cyclopentyl | ---------- | [1] 188–189 |
| 20 | $CH_3$ | p | H | $CH_2$ | cyclohexyl | ---------- | [1] 224–225 |
| 21 | $CH_3$ | m | p-$CH_3O$ | $CH_2$ | $CH_3$ | 110–12/0.65 | [1] 183–184 |
| 22 | $CH_3$ | m | p-$CH_3O$ | $CH_2$ | $CH(CH_3)_2$ | ---------- | [3] 187–189 |
| 23 | $CH_3$ | 5 | 2-$CH_3O$ | $CH_2$ | $CH_3$ | ---------- | [3] 146–147 |
| 24 | $CH_3$ | 5 | 2-$CH_3O$ | $CH_2$ | $CH(CH_3)_2$ | 115–17/0.5 | [4] 200–201 |

[1] Recryst. isopropyl alcohol-ether.
[2] Recryst. acetone-ether.
[3] Recryst. acetone.
[4] Recryst. ethanol-ether.
[5] Recryst. benzene-pet. ether.

Analysis.—Calculated for $C_{11}H_{14}F_3NO \cdot HCl$: N, 5.19; $Cl^-$, 13.15. Found: N, 4.66; $Cl^-$, 12.92.

Example 4.—N-methyl-γ-methoxy-(3-trifluoromethylphenyl)propylamine hydrochloride (a) α,γ - dichloro-p-propyl methyl ether.—Hydrogen chloride was passed through a stirred mixture of 23 g. (0.41 mole) of acrolein and 13.1 g. (0.41 mole) of methanol at 0° until 32 g. had been absorbed. After an additional 20 minutes the layers were separated and the lower layer was dried over calcium chloride and distilled. Yield: 38 g. (64 percent) of α,γ-dichloro-p-propyl methyl ether, B.P. 48–51° (16 mm.). Reported: B.P. 45° (12 mm.); C.A. 18, 815.

(b) γ-methoxy-γ-(3-trifluoromethyl)phenylpropyl chloride.—To the stirred Grignard reagent, prepared from 27 g. (0.12 mole) of m-bromobenzotrifluoride and 2.9 g. (0.12 g. at.) of magnesium in ether, there was added dropwise an ether solution of the above dichloro compound. Stirring and refluxing were continued for one hour after the addition, after which the mixture was poured over iced hydrochloric acid. The ether layer was separated, dried and fractionally distilled to yield 17.3 g. (57 percent( of γ-methoxy - γ - (3-trifluoromethyl)phenylpropyl chloride, B.P. 82–85° (0.5 mm.).

A related invention are the primary amines otherwise corresponding to the secondary amines described herein, i.e., those represented by Formula I wherein R is hydrogen. These compounds also possess pharmacological activity, including CNS depressant activity. They are also useful as intermediates in the production of the corresponding secondary amines of this invention by alkylation with an appropriate hydrocarbon halide or with ethylene oxide. The following example is representative of the manner of producing these primary amines by the reaction of the corresponding lower-alkoxy-trifluoromethylphenylalkyl halide with ammonia.

β-methoxy-β-(m-trifluoromethyl)phenethylamine hydrochloride

Twenty-two grams (0.078 mole) of β-methoxy-β-(m-trifluoromethyl)phenethyl bromide was combined with 400 ml. of methanol which had been saturated with ammonia at 10°. The solution, contained in an autoclave, was heated to 80–90° for 5 hours and cooled. The alcohol was removed by distillation and the residue was partitioned between dilute sodium hydroxide and ether. The ether solution was washed, dried and distilled to yield 13.2 g. (77 percent) of β-methoxy-β-(m-trifluoromethyl) phenethylamine; B.P. 110–118° (22 mm.). The hydrochloride, prepared in ether and recrystallized from isopropyl alcohol-ether, melted at 168–169°.

Analysis.—Calculated for $C_{10}H_{12}F_3NO \cdot HCl$: N, 5.48; $Cl^-$, 13.88. Found: N, 5.46; $Cl^-$, 13.94.

What is claimed is:

1. A compound of the formula

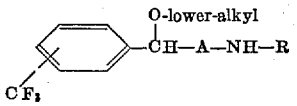

wherein A is a divalent alkylene group containing from one to eight carbon atoms and forming a one to three carbon atom bridge and R is a member of the group consisting of alkyl and cycloalkyl containing up to eight carbon atoms [.], *or a pharmaceutically acceptable acid addition salt thereof.*

2. A compound of claim 1 wherein the $-CF_3$ group is meta.

3. A compound of the formula

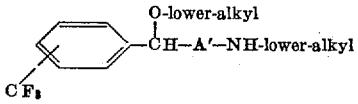

wherein A′ is a divalent alkylene group containing from one to two carbon atoms and forming a methylene bridge.

4. A compound of the formula

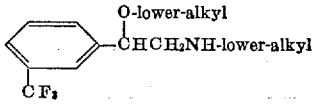

5. N-lower-alkyl-β-methoxy - m - trifluoromethylphenethylamine

6. N-methyl-β-methoxy - m - trifluoromethylphenethylamine.

7. A compound of the formula

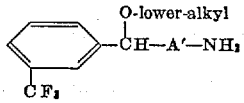

wherein A′ is a divalent alkylene group containing from one to two carbon atoms and forming a methylene bridge[.], *or a pharmaceutically acceptable acid addition salt thereof.*

References Cited

The following references, cited by the Examiner, are of record in the patented file of this patent or the original patent.

UNITED STATES PATENTS

| | | | |
|---|---|---|---|
| 3,281,468 | 10/1966 | Mills | 260—570.6 |
| 3,079,403 | 2/1963 | Weinstock | 260—349 |
| 3,151,124 | 9/1964 | Huebner | 260—326.5 |
| 3,226,440 | 12/1965 | Sahyun et al. | 260—570.6 |

OTHER REFERENCES

Madinaveitia, "Chemical Abstracts," vol 16, page 92 (1922).

Madinaveitia, "Chemical Abstracts," vol. 16, pp. 1946–47 (1922).

Poos et al.: "Chemical Abstracts," vol. 59, pp. 1610–11 (1963).

Steinberg et al.: "Jour. Org. Chem.," vol. 13, page 413 (1948).

Kaye et al.: "Journal Amer. Chem. Soc.," vol 73, pp. 4893–5 (1951).

ROBERT V. HINES, Primary Examiner

U.S. Cl. X.R.

260—501.17, 611 A, 614 R, 665 G; 424—330